United States Patent [19]
Zhang

[11] Patent Number: 6,159,075
[45] Date of Patent: Dec. 12, 2000

[54] METHOD AND SYSTEM FOR IN-SITU OPTIMIZATION FOR SEMICONDUCTOR WAFERS IN A CHEMICAL MECHANICAL POLISHING PROCESS

[75] Inventor: Liming Zhang, Sunnyvale, Calif.

[73] Assignee: VLSI Technology, Inc., San Jose, Calif.

[21] Appl. No.: 09/417,417

[22] Filed: Oct. 13, 1999

[51] Int. Cl.$^7$ .................................................. B24B 49/00
[52] U.S. Cl. ..................................... 451/8; 451/5; 451/41; 451/285; 451/287
[58] Field of Search ............................. 451/8, 5, 41, 285, 451/287

[56] References Cited

U.S. PATENT DOCUMENTS

| | | |
|---|---|---|
| 5,851,135 | 12/1998 | Sandhu et al. . |
| 5,904,609 | 5/1999 | Fukuroda et al. . |
| 6,000,996 | 12/1999 | Fujiwara . |
| 6,004,187 | 12/1999 | Nyui et al. . |
| 6,012,966 | 1/2000 | Ban et al. . |

*Primary Examiner*—David A. Scherbel
*Assistant Examiner*—Willie Berry, Jr.
*Attorney, Agent, or Firm*—Wagner, Murabito & Hao LLP

[57] ABSTRACT

A method for optimizing CMP (chemical mechanical polishing) processing of semiconductor wafers on a CMP machine. The optimization method includes the steps of polishing a test series of semiconductor wafers on a CMP machine. During the CMP processing, a film thickness is measured at a first point proximate to the center of each respective wafer using a film thickness detector coupled to the machine. A film thickness at a second point proximate to the outside edge of the respective wafers is also measured. Based upon the in-process film thickness measurements at the first point and the second points, the optimization process determines a polishing profile describing a removal rate and a removal uniformity with respect to a set of process variables. The process variables include different CMP machine settings for the polishing process, such as the amount of down force applied to the wafer. The polishing profile is subsequently used to polish production wafers accordingly. For each production wafer, their respective removal rate and removal uniformity is determined by measuring a film thickness at the center of each production wafer and a film thickness at the outside edge of each production wafer using the film thickness detector. Based upon these measurements, the set of process variables is adjusted in accordance the removal rate and the removal uniformity measurements to optimize the CMP process for the production wafer as each respective wafer is being polished.

18 Claims, 7 Drawing Sheets

METHOD AND SYSTEM FOR IN-SITU OPTIMIZATION FOR SEMICONDUCTOR WAFERS IN A CHEMICAL MECHANICAL POLISHING PROCESS

TECHNICAL FIELD

The field of the present invention pertains to semiconductor fabrication processing. More particularly, the present invention relates to a system for in-situ optimization of the polishing process of a chemical mechanical polishing (CMP) machine to improve process efficiency.

BACKGROUND ART

Most of the power and usefulness of today's digital IC device s can be attributed to the increasing levels of integration. More and more components (resistors, diodes, transistors, and the like) are continually being integrated into the underlying chip, or IC. The starting material for typical ICs is very high purity silicon. The material is grown as a single crystal. It takes the shape of a solid cylinder. This crystal is then sawed (like a loaf of bread) to produce wafers typically 10 to 30 cm in diameter and 250 microns thick.

The geometry of the features of the IC components are commonly defined photographically through a process known as photolithography. Very fine surface geometries can be reproduced accurately by this technique. The photolithography process is used to define component regions and build up components one layer on top of another. Complex ICs can often have many different built up layers, each layer having components, each layer having differing interconnections, and each layer stacked on top of the previous layer. The resulting topography of these complex IC's often resemble familiar terrestrial "mountain ranges", with many "hills" and "valleys" as the IC components are built up on the underlying surface of the silicon wafer.

In the photolithography process, a mask image, or pattern, defining the various components, is focused onto a photosensitive layer using ultraviolet light. The image is focused onto the surface using the optical means of the photolithography tool, and is imprinted into the photosensitive layer. To build ever smaller features, increasingly fine images must be focused onto the surface of the photosensitive layer, i.e. optical resolution must increase. As optical resolution increases, the depth of focus of the mask image correspondingly narrows. This is due to the narrow range in depth of focus imposed by the high numerical aperture lenses in the photolithography tool. This narrowing depth of focus is often the limiting factor in the degree of resolution obtainable, and thus, the smallest components obtainable using the photolithography tool. The extreme topography of complex ICs, the "hills' and "valleys," exaggerate the effects of decreasing depth of focus. Thus, in order to properly focus the mask image defining sub-micron geometries onto the photosensitive layer, a precisely flat surface is desired. The precisely flat (i.e. fully planarized) surface will allow for extremely small depths of focus, and in turn, allow the definition and subsequent fabrication of extremely small components.

Chemical-mechanical polishing (CMP) is the preferred method of obtaining full planarization of a wafer. It involves removing a sacrificial layer of material using mechanical contact between the wafer and a moving polishing pad saturated with slurry. Polishing flattens out height differences, since high areas of topography (hills) are removed faster than areas of low topography (valleys). Polishing is the only technique with the capability of smoothing out topography over millimeter scale planarization distances leading to maximum angles of much less than one degree after polishing.

Prior art FIG. 1 shows a down view of a CMP machine 100 and prior art FIG. 2 shows a side view of the CMP machine 100. The CMP machine 100 is fed wafers to be polished. The CMP machine 100 picks up the wafers with an arm 101 and places them onto a rotating polishing pad 102. The polishing pad 102 is made of a resilient material and is textured to aid the polishing process. The polishing pad 102 rotates on a platen 104, or turn table located beneath the polishing pad 102, at a predetermined speed. A wafer 105 is held in place on the polishing pad 102 and the arm 101. The front side of the wafer 105 rests against the polishing pad 102. As the polishing pad 102 rotates, the arm 101 rotates the wafer 105 at a predetermined rate. The arm 101 forces the wafer 105 into the polishing pad 102 with a predetermined amount of down force. The CMP machine 100 also includes a slurry dispense arm 107 extending across the radius of the polishing pad 102. The slurry dispense arm 107 dispenses a flow of slurry onto the polishing pad 102.

The slurry is a mixture of deionized water and polishing agents designed to chemically aid the smooth and predictable planarization of the wafer. The rotating action of both the polishing pad 102 and the wafer 105, in conjunction with the polishing action of the slurry, combine to planarize, or polish, the wafer 105 at some nominal rate. This rate is referred to as the removal rate. A constant and predictable removal rate is important to the uniformity and throughput performance of the wafer fabrication process. The removal rate should be expedient, yet yield precisely planarized wafers, free from surface anomalies. If the removal rate is too slow, the number of planarized wafers produced in a given period of time decreases, hurting wafer throughput of the fabrication process. If the removal rate is too fast, the CMP planarization process may not be as precise as desired (leading to dishing, erosion, overpolishing, etc.), hurting the yield of the fabrication process.

Referring still to FIG. 1 and FIG. 2, as described above, the polishing action of the slurry and polishing pad 102 determines the removal rate and the removal rate uniformity, and thus, the effectiveness of the CMP process. Process engineers have discovered that in order to obtain sufficiently high and sufficiently stable removal rates, a large number of blanket wafers need to be processed on a respective CMP machine in order to properly calibrate the CMP process of the machine (e.g., "break-in" the machine's polishing pad, calibrate the slurry delivery rate, adjust wafer down-pressure, etc.). Each of these blanket wafers will typically show different removal rates as they are processed.

For example, in the case of a tungsten interconnect layer planarization process on CMP machine 100, the first of a batch of wafers show very low removal rates. The later processed wafers show much higher removal rates. Each successive wafer processed shows an incrementally higher removal rate. For a typical process, a large number of wafers will need to be processed in order for the removal rate of the tungsten layer of the wafers sufficiently increases, and perhaps more importantly, nominally stabilizes at a specified level. Until the removal rate of CMP machine 100 is sufficiently stabilized (e.g., calibrated to some nominal removal rate for each successive wafer) CMP machine 100 is unsuitable for device fabrication processing. Any fabricated wafer processed by CMP machine 100 and polishing pad 102 would have unpredictable planarity and film thickness, and hence would include many non-functional or unreliable integrated circuit dies, and accordingly, a relatively low yield.

Consequently, conventional CMP calibration methods include the processing of a large number of "test wafers" (or blanket wafers) using the target CMP machine (e.g., CMP machine 100). The tests are designed to obtain the various parameters which described the efficiency of the CMP process. To such parameters are the removal rate of the film material to be removed from the wafer and the uniformity in the material removal. These two parameters are a basic indicator of the quality of the CMP process. The removal rate will mainly be used to determine the polishing time of product wafers. The uniformity in material removal directly affects the global planarity across the wafer surface, which becomes more important as larger wafers are used in the fabrication of devices. Both the removal rate and the uniformity depend on consumables and polishing parameters including the pressure or down force, the speed of the polishing table, the speed of the wafer carrier, the slurry flow, and others. After a combination of consumables are chosen, the polishing parameters can be adjusted to achieve expected removal rate and uniformity.

There are significant drawbacks with this conventional calibration process. Because of several potential variations in production wafers (i.e., wafers with different devices) and in CMP process itself (e.g., the constant changing of the removal rate with pad wear), an end-point detector is widely used. Ideally, with in situ end-point detection, the stopping of a CMP process can be triggered at correct time regardless of the actual polishing rate. For example, if the polishing rate is lowered because of certain variations in the process, the end point will appear later and the polishing process will last longer. As a matter of fact the polishing time should also be related to the uniformity in material removal. In general, for example, with a metal CMP process (which removes excess metal film and ends the wafer surface with metal lines, or vias, surrounded by dielectric material) has a high non-uniformity, it will be required to have a long over-polish time in order to ensure the excess film is cleared across the wafer surface. On the other hand, if the CMP process has a very low non-uniformity, it will be affordable to have a little over-polish because the excess film clears at the same time across the wafer surface. Currently, the end-point method is mostly used to monitor the amount of film removal but not the non-uniformity. Additionally, the end-point detection only controls one variable, the polishing time, without providing any insight or control of the various other process variables. This greatly increases the number of test wafers needed in order to achieve a stable process.

Another drawback is the fact that there is a significant cost associated with these test wafers. In addition to the cost of the test wafers, there is a significant time penalty associated with breaking-in each new polishing pad and otherwise properly calibrating the CMP process of the machine. To attain a nominal removal rate (e.g., 4000 to 5000 Angstroms per minute) 20 to 50 test wafers must be processed, where each wafer consumes a valuable amount of processing time. In addition, the processing of test wafers subtracts from the useful life of the polishing pad 102 since it only has a finite amount of polishing cycles before it requires a change out. Another drawback of this conventional method of breaking in polishing pad 102 is the uncertainty associated with the number of test wafers which need to be processed in order to properly break-in a respective polishing pad.

Thus, what is required is a system which greatly reduces the number of test wafers required for properly calibrate a CMP process. What is required is a system which reduces the cost associated with achieving a stable CMP process. What is further required is a system which decreases the amount of process time and consumables required to qualify a fabrication line CMP machine. The present invention provides a novel solution to the above requirements.

SUMMARY OF THE INVENTION

The present invention provides a system which greatly reduces the number of test wafers required to properly calibrate a CMP process. The present invention provides a system which reduces the cost associated with achieving a stable CMP process. The present invention further provides a system which decreases the amount of process time and consumables required to qualify a fabrication line CMP machine.

In one embodiment, the present invention is implemented as a method for optimizing CMP (chemical mechanical polishing) processing of semiconductor wafers on a CMP machine. The optimization method includes the steps of polishing a test series of semiconductor wafers on a CMP machine. During the CMP processing, a film thickness is measured at a first point proximate to the center of each respective wafer using a film thickness detector coupled to the machine. A film thickness at a second point proximate to the outside edge of the respective wafers is also measured. Based upon the in-process film thickness measurements at the first point and the second points, the optimization process determines a polishing profile describing a removal rate and a removal uniformity with respect to a set of process variables.

The process variables include different CMP machine settings for the polishing process, such as the amount of down force applied to the wafer. The polishing profile is subsequently used to polish production wafers accordingly. For each production wafer, their respective removal rate and removal uniformity is determined by measuring a film thickness at the center of each production wafer and a film thickness at the outside edge of each production wafer using the film thickness detector. Based upon these measurements, the set of process variables is adjusted in accordance the removal rate and the removal uniformity measurements to optimize the CMP process for the production wafer as each respective wafer is being polished. In so doing, the present invention provides a system that reduces the cost associated with achieving a stable CMP process.

BRIEF DESCRIPTION OF THE DRAWINGS

The present invention is illustrated by way of example and not by way of limitation, in the figures of the accompanying drawings and in which like reference numerals refer to similar elements and in which.

Prior Art

Prior Art

DETAILED DESCRIPTION OF THE INVENTION

Reference will now be made in detail to the preferred embodiments of the invention, a method and system for in-situ optimization for semiconductor wafers in a chemical mechanical polishing process, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not unnecessarily to obscure aspects of the present invention.

The present invention provides a system that greatly reduces the number of test wafers required for properly calibrate a CMP process. The present invention provides a system which reduces the cost associated with achieving a stable CMP process. Additionally, the system of the present invention decreases the amount of process time and consumables required to qualify a fabrication line CMP machine. The present invention and its advantages are further described below.

Chemical-mechanical polishing (CMP) is the preferred method of obtaining full planarization of a semiconductor wafer containing devices for fabrication processing. The CMP process involves removing a sacrificial layer of material using both the frictional contact between the wafer and a moving polishing pad saturated with a polishing slurry and the chemical action of the slurry itself. Polishing through the CMP process flattens out height differences, since high areas of topography (hills) are removed faster than areas of low topography (valleys). The CMP process is the preferred technique with the capability of smoothing out topography over millimeter scale planarization distances leading to maximum angles of much less than one degree after polishing.

The CMP process can be very expensive, particularly with the more precise fabrication processes (e.g., deep submicron lithography, etc.). For a properly qualified fabrication line CMP machine, the removal rate and planarization uniformity needs to be sufficiently stabilized (e.g., calibrated to some nominal removal rate for each successive wafer) to render the machine suitable for device fabrication processing. The present invention provides a system which decreases the amount of process time and consumables required to qualify a fabrication line CMP machine.

Figure 1:
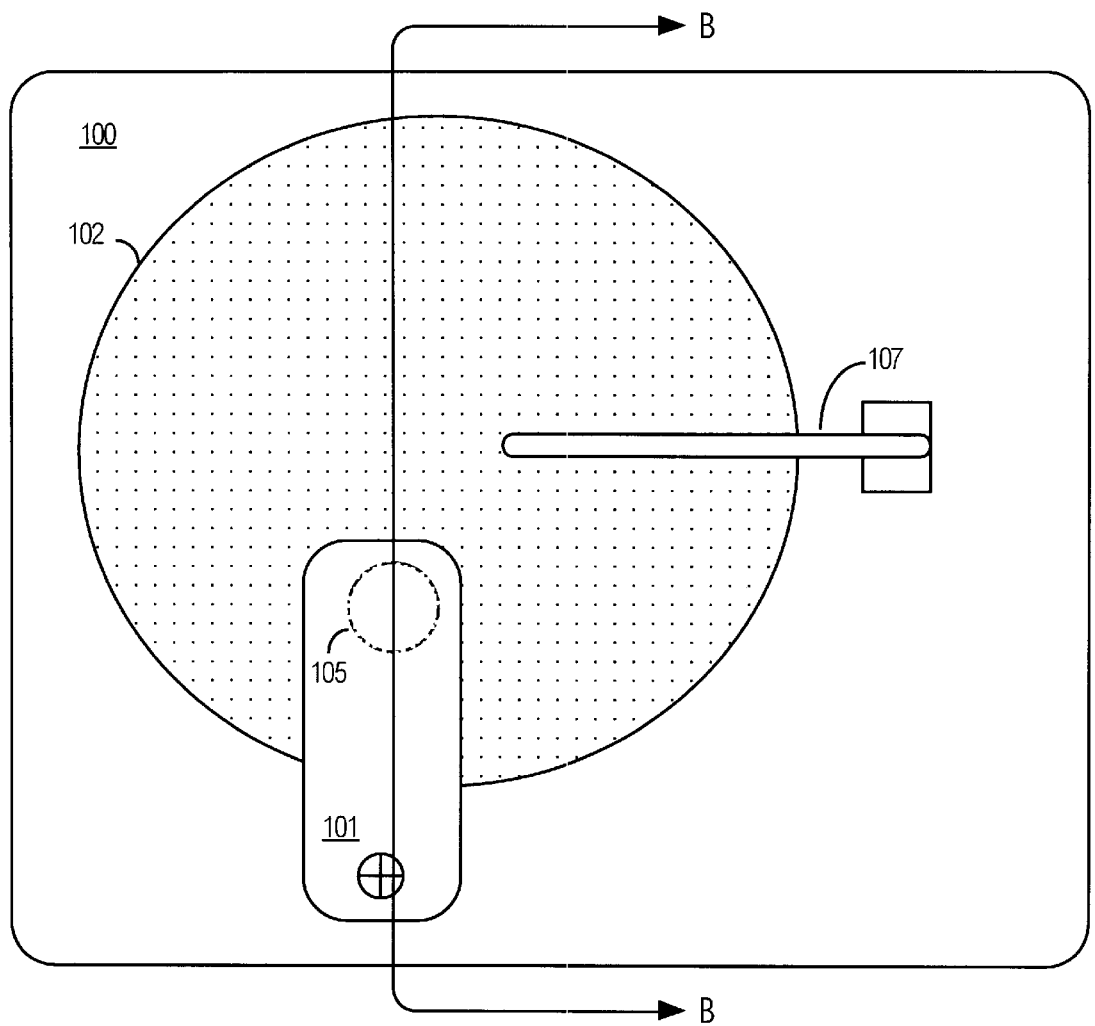
FIG. 1 shows a down view of a prior art CMP machine.
Figure 2:
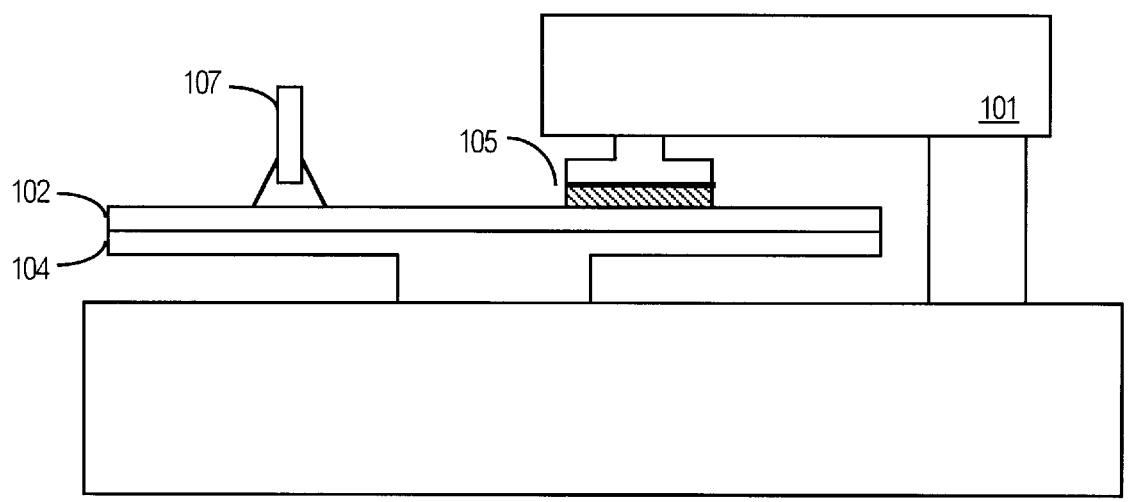
FIG. 2 shows a side cut away view of the prior art CMP machine of FIG. 1.
Figure 3A:
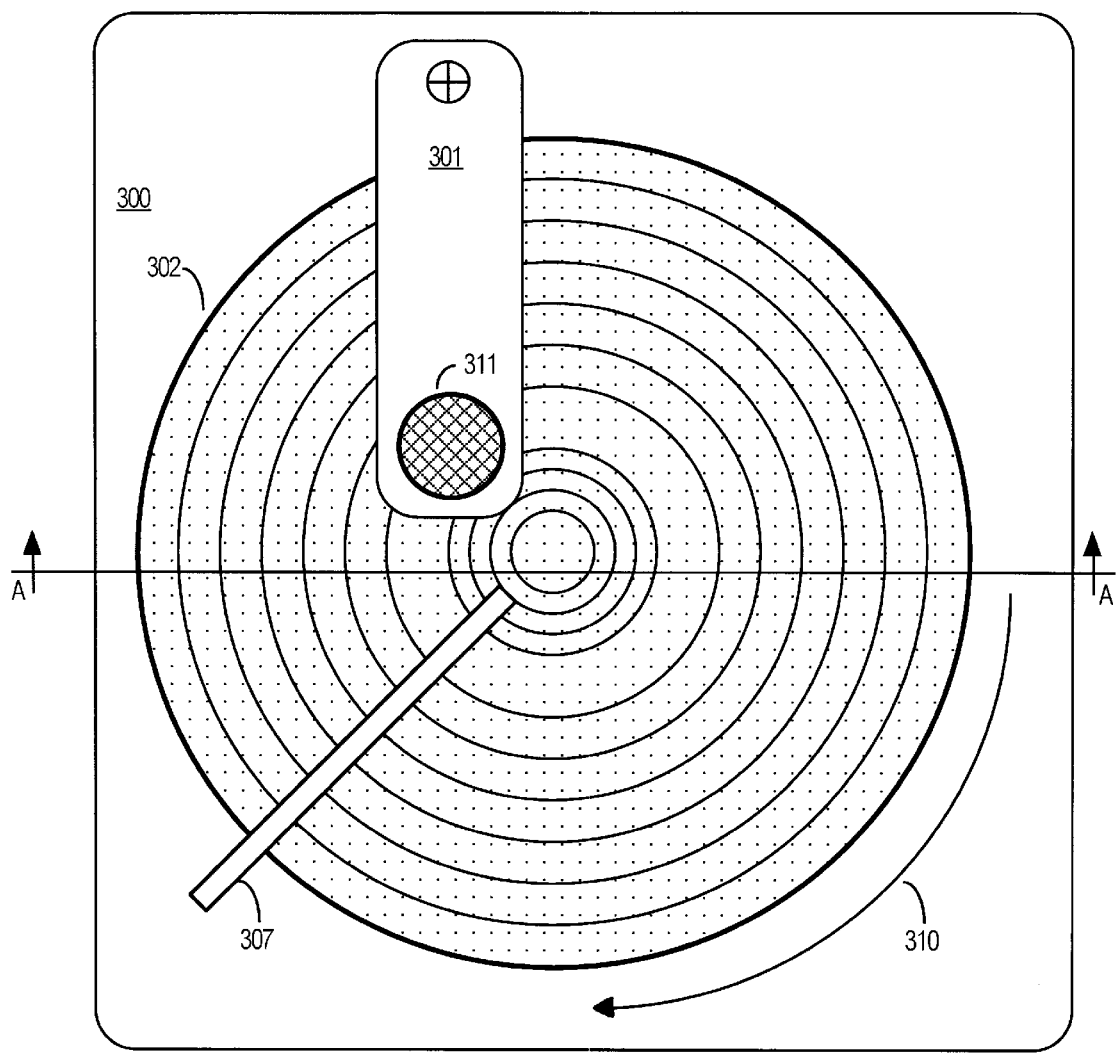
FIG. 3A shows a down view of a CMP machine in accordance with one embodiment of the present invention.
Figure 3B:
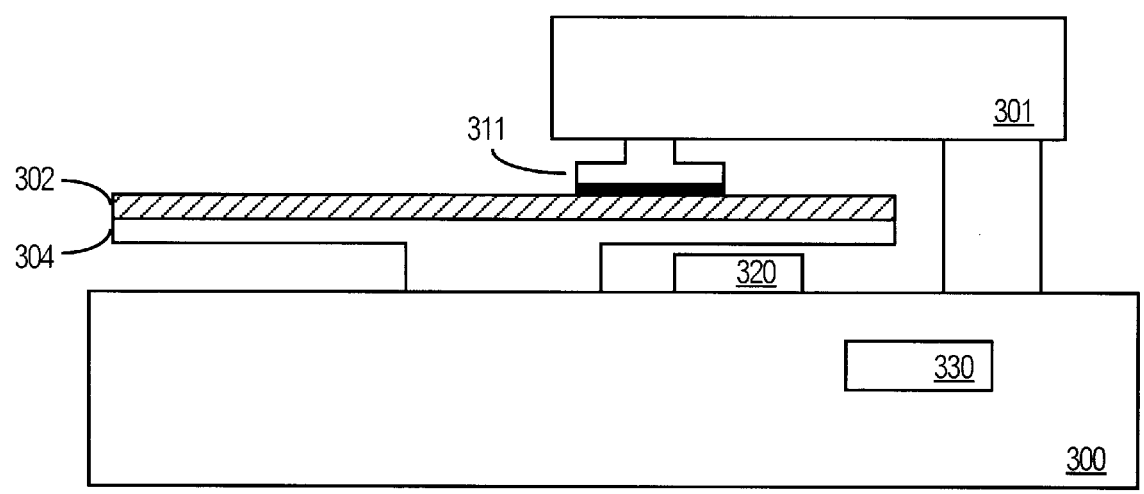
FIG. 3B shows a side cut away view of the CMP machine of FIG. 3A.

Referring now to FIG. 3A and FIG. 3B, a down view of a CMP machine 300 in accordance with the present invention is shown, and a side cut-away view of the CMP machine 300 taken through line A—A is shown. The CMP machine 300 picks up wafers with an arm 301 and places them onto rotating polishing pad 302. The polishing pad 302, of CMP machine 300, rotates on a platen 304, or turn table located beneath the polishing pad 302, at a predetermined speed. The arm 301 forces a wafer 311 into the polishing pad 302 with a precisely controlled amount of down force (e.g., as determined by the specific polishing effect desired). The wafer 311 is held in place on the polishing pad 302 by arm 301. The front side of the wafer 311 rests against the polishing pad 302. The back side of the wafer 311 is against the front side of the arm 301. As the polishing pad 302 rotates at a precisely controlled speed, the arm 301 rotates the wafer 311 at a precisely controlled rate. CMP machine 300 also includes a film thickness detector 320 for measuring the thickness of the upper layer of the front side of wafer 311, and a computer system 330 for assessing and controlling the performance of the CMP process of CMP machine 300.

In an example CMP process in accordance with one embodiment of the present invention, the slurry used by CMP machine 300 is a mixture of deionized water and polishing agents designed to chemically aid the smooth and predictable planarization of the upper oxide layer of wafer 311. The rotating action of both the polishing pad 302 and the wafer 311, in conjunction with the polishing action of the slurry, combine to planarize, or polish, the wafer 311 at some nominal rate. This rate is referred to as the removal rate. A constant and predictable removal rate is important to the uniformity and performance of the wafer fabrication process. The removal rate should be expedient, yet yield precisely planarized wafers, free from surface anomalies. If the removal rate is too slow, the number of planarized wafers produced in a given period of time decreases, hurting wafer throughput of the fabrication process. If the removal rate is too fast, the CMP planarization process will not be uniform across the surface of the wafers, hurting the yield of the fabrication process. Just as important as removal rate is the uniformity at which the surface material (e.g., oxide) is polished away. To maintain acceptable yields, it is very important that the upper layer(s) of the wafer 311 are removed uniformly across the surface.

Figure 4:
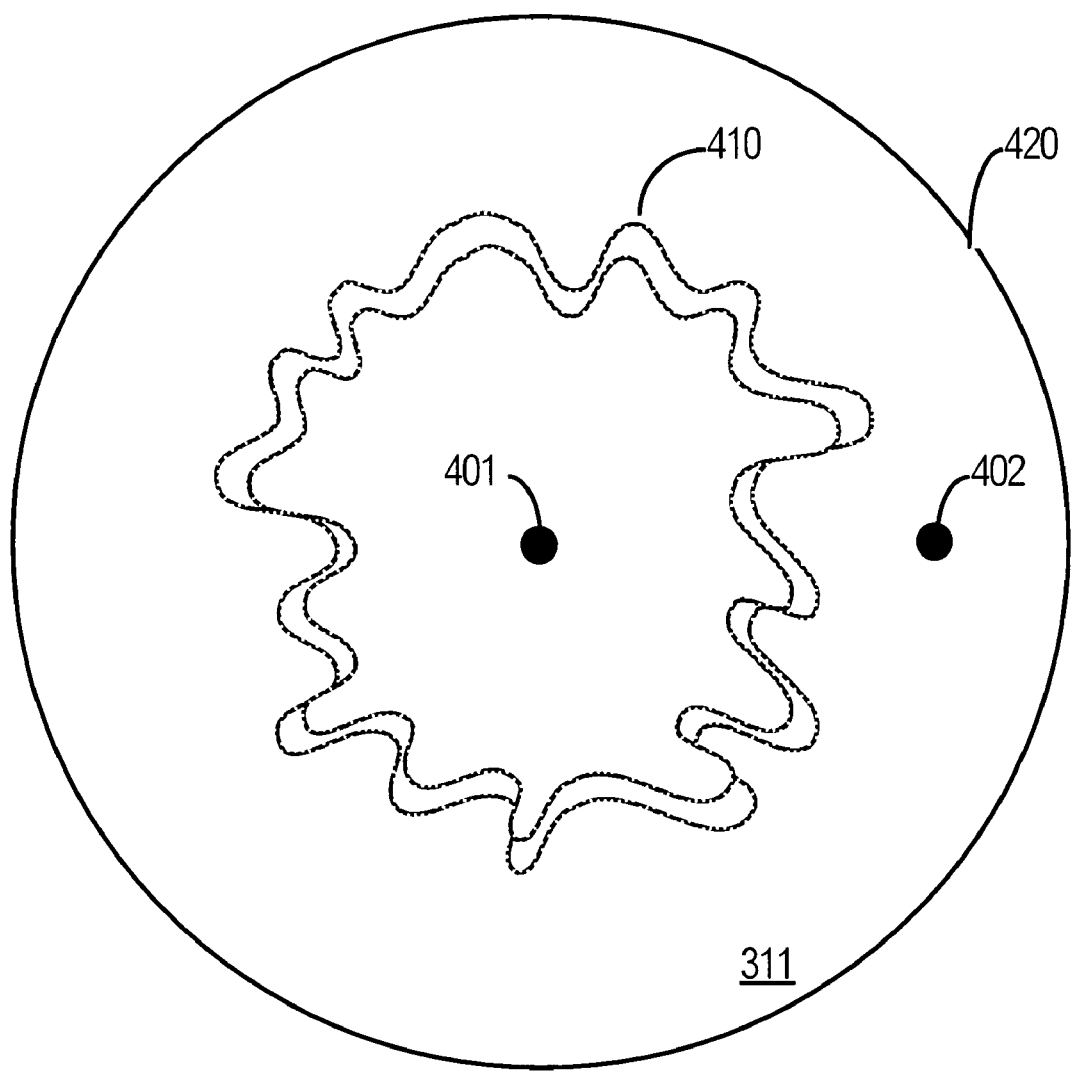
FIG. 4 shows a wafer having a first and a second film thickness measuring point in accordance with one embodiment of the present invention.

FIG. 4 shows a diagram wafer 311 having an outer region 420 and a center region 410. Wafer 311 is also depicted having a first film thickness measuring point 401 and a second film thickness measuring point 402. Measure points 401–402 lay within the center region 410 and the outer region 420 respectively.

In accordance with one embodiment of the present invention, the CMP process performed by CMP machine 300 is configured to perform "in-situ" CMP process optimization. The variables and conditions affecting the performance of the CMP process can be altered in-situ, as wafer 311 is being polished, in order to ensure the desired process results are obtained.

The in-situ optimization process begins with the polishing of a test series of semiconductor wafers on CMP machine 300. During the CMP processing, a film thickness is measured at the first film thickness measuring point (hereafter center point) 401 and at the second film thickness measuring point (hereafter outer point) 402. In the present embodiment, the measurements are taken using a film thickness detector 320 coupled to the CMP machine 300. The center point 401 provides an indication of the thickness of the upper layer of material on the front side of wafer 311 in the center region 410. Similarly, the outer point 402 provides an indication of the thickness of the upper layer of the front side of wafer 311 in the outer region 420. In the present embodiment, these measurements are taken in-situ, meaning they are taken as wafer 311 is being processed by CMP machine 300. Based upon the in-process film thickness measurements at inner and outer points 401–402, the optimization process of the present invention determines a polishing profile describing a removal rate and a removal uniformity with respect to a set of process variables.

The process variables include different CMP machine settings for the polishing process, such as the amount of down force applied to the wafer 311. The performance of the CMP process and its overall success depends largely on the chemical and mechanical interactions between the wafer 311, the pad 350 and the slurry or other chemicals. Any variations in the slurry composition, the condition of the pad, and the properties of the wafer 311 (e.g., the nature of the devices fabricated thereon) will lead to differences in the CMP process. For example, the polishing rate of a film can change as the polishing pad ages although there is in situ or ex-situ pad conditioning (e.g., from a conditioner assembly). These factors collectively comprise the variables that affect the CMP process and are thus collectively referred to as the process variables, and the polishing profile is defined in terms of the process variables.

Referring still to FIG. 4, the polishing profile is subsequently used to polish production wafers accordingly. For each production wafer, their respective removal rate and removal uniformity is determined by in situ measuring at the center and outer points 401–402 using the film thickness detector 320. Based upon these measurements, the set of process variables are adjusted in accordance the removal rate and the removal uniformity measurements as dictated by the previously determined polishing profile. The polishing profile provides an indication as to the nature and degree of adjustment in relation to changes in removal rate and removal rate uniformity. These adjustments to the process variables are implemented in-situ, to optimize the CMP process for the production wafer as the wafer is being polished.

In this manner, the present embodiment uses two parameters obtained during the processing of test wafers, the removal rate and the uniformity, as indicators for adjusting the process variables. In most situations, these two parameters adequately indicate the quality of the CMP process. The removal rate mainly determines the polishing time of product wafers, while the uniformity directly affects the global planarity across the wafer surface (which becomes more important as larger wafers are used in the fabrication of devices). Both the removal rate and the uniformity function as reliable indicators since they both largely depend on process parameters such as, for example, consumables, platen speed (e.g., rpm), wafer rotation speed, slurry flow rate, temperature, down force, etc. In the present embodiment, after a combination of consumables are chosen, various other process variables can be adjusted to achieve expected removal rate and uniformity.

Referring still to FIG. 4, the in-situ optimization method of the present invention takes advantage of existing functionality often employed in typical CMP processes. For example, a typical end-point detection method uses a film thickness detection unit (e.g., film thickness detector 320) to directly measure the material removal. Techniques employed by the detector include, for example, measuring the intensity of a laser beam reflected by the wafer surface as an indication of the amount of film remaining.

The film thickness measurements at the two or more carefully chosen sites (e.g., the outer point and the center point) are used to run a design of experiments (DOE) considering all process parameters which affect the polishing rate and the uniformity in removal. The DOE primarily comprises the polishing profile with which the product wafers will be polished. While polishing first product wafers, the "clear time" at the wafer edge and the wafer center is recorded and processed together the polishing profile data by a computer system 330. According to the results, necessary adjustments will be made to the process parameters (such as the down force, the table speed and so on) in accordance with the polishing profile such that the uniformity and removal rate are within the correct range as specified by, for example, a process engineer. If one or more aspects of the CMP process happen to be out of specification, the computer system 330 will detect and correct them, or otherwise compensate. For example, if the removal rate and the uniformity in removal cannot be satisfied simultaneously, the computer system 330 may choose to lower the requirement for the removal rate while keeping the uniformity.

It should be noted that this proposed method also can be applied to optimize some aspects of a CMP process other than the removal rate and the uniformity, such as the pad temperature, vibration during CMP, and the like. Moreover, it should be appreciated that in some applications, more than two points of film thickness detection on the wafer surface may be required. Using multiple points (e.g., three or more) distributed across the wafer surface can allow a more precise assessment of removal rate and uniformity. Hence, the in-situ optimization process of the present invention, elongates the lifetime of consumables, and minimizes the effort and resources of qualifying the CMP machine. With in-situ optimization, a higher throughput and a lower cost of CMP can be achieved.

There are additional benefits provided by the in-situ optimization process of the present invention. For example, because of several potential variations in production wafers (e.g., wafers with different devices fabricated thereon), the varying removal rate, and in CMP process itself, an "end-point" detector is widely used to detect the time at which the correct amount of material has been removed. With in situ endpoint detection of the present invention, however, the stopping of a CMP process can be triggered at correct time regardless of the actual polishing rate. For example, if the polishing rate is lowered because of a certain variation in the CMP process, the end point will appear later and the polishing process will last longer. In the present embodiment, polishing time tends to be closely related to the uniformity in material removal.

In general, for example, if a metal CMP process (which removes excess metal film and ends the wafer surface with metal tines or vias surrounded by dielectric material) has a high non-uniformity, it will be required to have a long "over-polish" time in order to ensure the excess metal film is cleared across the wafer, on the other hand, if the CMP process has a very low non-uniformity, acceptable results can be achieved with a little over-polish because the excess film clears at the same time across the wafer. Thus, with the in-situ optimization process of the present invention, multiple film thickness measurements (e.g., at points 401–402) are used to monitor the amount of film removal and the uniformity, thereby inherently enabling reliable end-point detection for control of the total polishing time without changing any other process parameters. Hence, the in-situ optimization process of the present invention beneficially extends the concept of detecting the end-point of a CMP process.

Figure 5:
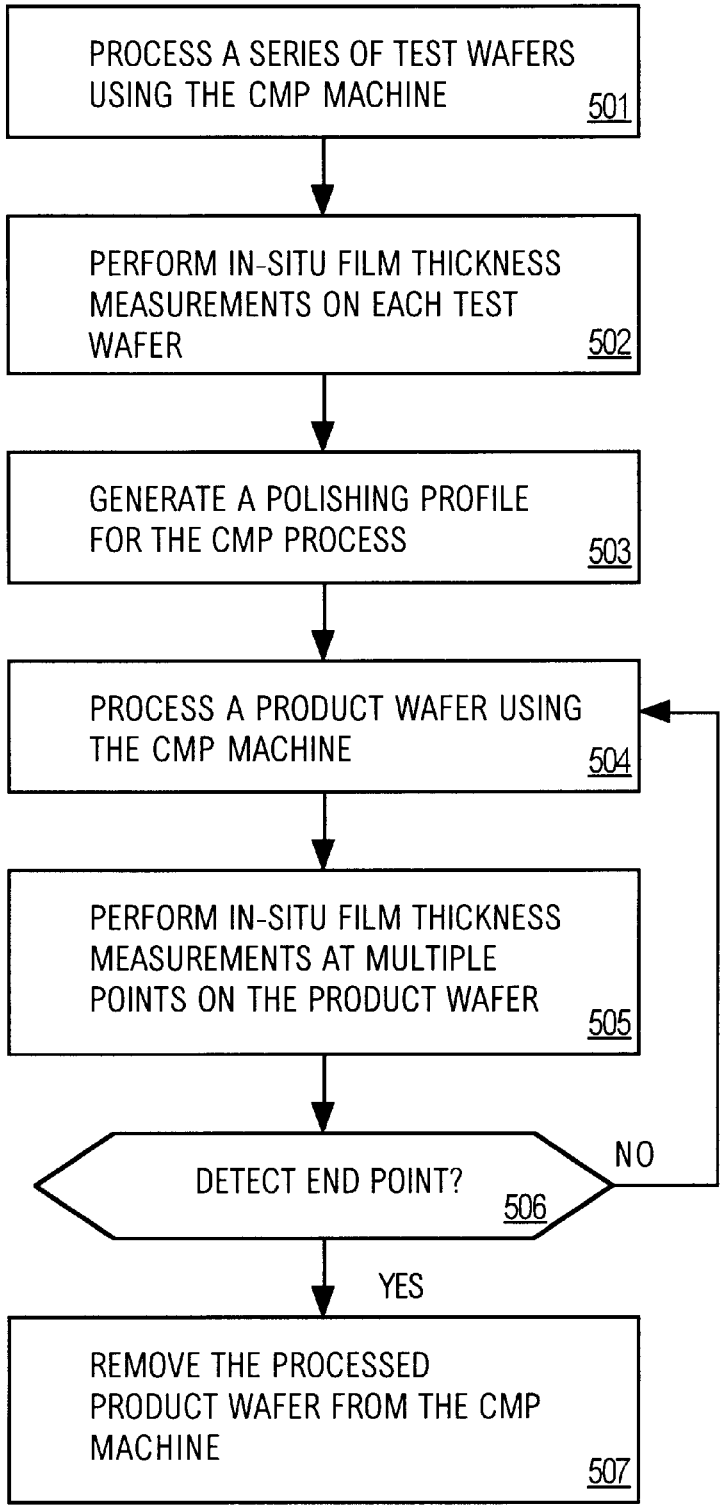
FIG. 5 shows a flow chart of the steps of a CMP process in accordance with one embodiment of the present invention.

Referring now to FIG. 5, a flow chart of the steps of a process 500 in accordance with one embodiment of the present invention is shown. As depicted in FIG. 5, process 500 depicts the steps of the in-situ optimization process of the present invention as test wafers are processed, the polishing profile determined, and a product wafer is processed. In this embodiment, process 500 also performs end-point detection.

Process 500 begins in step 501, where a series of test wafers are processed using the CMP machine to be qualified (e.g., CMP machine 300 of FIG. 3). As described above, the performance of the CMP machine needs to be qualified before actual product wafers are processed.

In step 502, in-situ film thickness measurements are taken on each of the test wafers. As described above, film thickness measurements on at least two points (e.g., center point 401 and outer point 402 of FIG. 4) are taken as the respective test wafer is being polished. The measurements allow an assessment of the removal rate and the removal rate uniformity of the CMP process of the CMP machine.

In step 503, the measurements from step 502 and the correlation of other process parameters are used to generate a polishing profile of the CMP process on CMP machine 300. As described above, the polishing profile describes the characteristics of the CMP process with respect to the polishing parameters. Based upon the polishing profile, CMP machine 300 is qualified for processing product wafers.

In step 504, once the polishing profile is determined, a product wafer is processed using the CMP machine 300.

In step 505, in accordance with the present invention, in-situ film thickness measurements are taken at multiple points (e.g., points 401–402) on the product wafer. As described above, film thickness measurements on the at least two points (e.g., points 401–402) allow an assessment of the removal rate and the removal rate uniformity of the CMP process as the product wafer is being processed.

In step 506, the measurements taken in step 505 determine whether the end point of the CMP process has been reached or not. If the end point has been reached, process 500 proceeds to step 507, else, process 500 loops back to step 504.

In step 507, after the end point has been reached, the processed product wafer is removed from the CMP machine 300.

Thus, the present invention provides a system that greatly reduces the number of test wafers required for properly calibrate a CMP process. The present invention provides a system which reduces the cost associated with achieving a stable CMP process. Additionally, the system of the present invention decreases the amount of process time and consumables required to qualify a fabrication line CMP machine.

Figure 6:
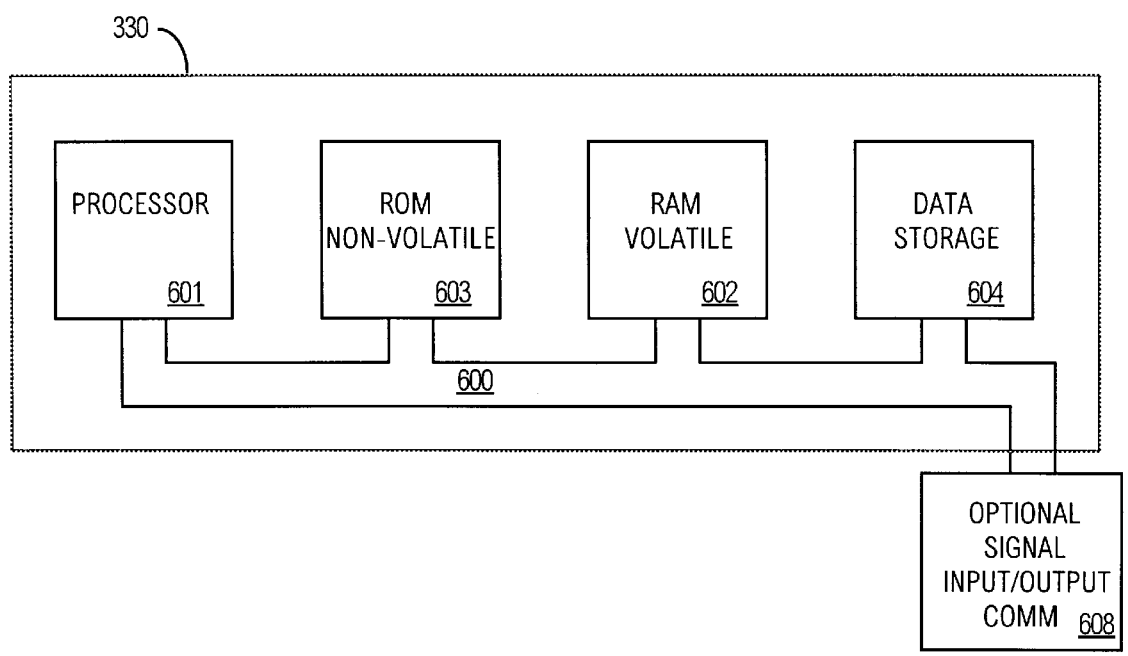
FIG. 6 shows a diagram of a computer system in accordance with one embodiment of the present invention.

With reference now to FIG. 6, a diagram of computer system 330 in accordance with one embodiment of the present invention is shown. In the present embodiment, computer system 330 is included in CMP machine 300 as shown in FIG. 3. Computer system 330 of FIG. 6 includes an address/data bus 600 for communicating information, one or more central processors 601 coupled with the bus 600 for processing information and instructions, a volatile memory 602 (e.g., random access memory RAM) coupled to the bus 600 for storing information and instructions for the central processor 601 and a non-volatile memory 603 (e.g., read only memory ROM) coupled to the bus 600 for storing static information and instructions for the processor 601. Computer system 330 can also optionally include data storage hardware 604, such as a flash memory or magnetic disk, for storing information and instructions. An optional bus interface/signal input output communications unit 608 for interfacing with other components of CMP machine 300 is also included.

The foregoing descriptions of specific embodiments of the present invention have been presented for purposes of illustration and description. They are not intended to be exhaustive or to Emit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for optimizing CMP (chemical mechanical polishing) processing of semiconductor wafers on a CMP machine, the method comprising the steps of:

a) polishing a test series of semiconductor wafers on a CMP machine b) determining a film thickness at a first point proximate to a center of the respective wafers using a film thickness detector coupled to the CMP machine;

c) determining a film thickness at a second point proximate to an outside edge of the respective wafers using the film thickness detector;

d) based upon the film thickness at the first point and the second point, determine a polishing profile describing a removal rate and a removal uniformity with respect to a set of process variables wherein the polishing profile includes information describing a clear time at the edge of the wafer and the clear time at the center of the wafer, the process variables including an amount of down force applied to the wafer;

e) polishing a production wafer on the CMP machine in accordance with the polishing profile;

f) determining a removal rate and a removal uniformity for the production wafer by determining a film thickness at the center of the product wafer and a film thickness at the outside edge of the product wafer using the film thickness detector; and g) adjusting the set of process variables in accordance with the removal rate and the removal uniformity for the production wafer determined in step f) to optimize the CMP process for the production wafer.

2. The method of claim 1 wherein the process variables include a rate of rotation of the wafer.

3. The method of claim 1 wherein the process variables include a rate of rotation of a polishing pad of the CMP machine.

4. The method of claim 1 further including the step of adjusting the set of process variables in accordance with the polishing profile to maintain the removal rate within a specified range.

5. The method of claim 1 further including the step of adjusting the set of process variables in accordance with the polishing profile to maintain the removal uniformity within a specified range.

6. The method of claim 1 further including the step of detecting an end point for the polishing by using the film thickness at the first point as determined in step b) and the film thickness at the second point as determined in step c).

7. The method of claim 1 wherein the polishing profile is determined by running a design of experiments considering the process variables that affect the removal rate and the removal uniformity.

8. A system for optimizing CMP (chemical mechanical polishing) processing of semiconductor wafers on a CMP machine, the CMP machine including a computer system for executing computer readable instructions causing the CMP machine to perform an optimization method comprising the steps of:

a) polishing a test series of semiconductor wafers on a CMP machine b) determining a film thickness at a first point proximate to a center of the respective wafers using a film thickness detector coupled to the CMP machine;

c) determining a film thickness at a second point proximate to an outside edge of the respective wafers using the film thickness detector;

d) based upon the film thickness at the first point and the second point, determine a polishing profile describing a removal rate and a removal uniformity with respect to a set of process variables wherein the polishing profile includes information describing a clear time at the edge of the wafer and the clear time at the center of the wafer, the process variables including an amount of down force applied to the wafer and a rate of rotation of a polishing pad of the CMP machine;

e) polishing a production wafer on the CMP machine in accordance with the polishing profile;

f) determining a removal rate and a removal uniformity for the production wafer by determining a film thickness at the center of the product wafer and a film thickness at the outside edge of the product wafer using the film thickness detector; and g) adjusting the set of process variables in accordance with the removal rate and the removal uniformity for the production wafer determined in step f) to optimize the CMP process for the production wafer.

9. The system of claim 8 wherein the process variables include a rate of rotation of the wafer.

10. The system of claim 8 further including the step of adjusting the set of process variables in accordance with the polishing profile to maintain the removal rate within a specified range.

11. The system of claim 8 further including the step of adjusting the set of process variables in accordance with the polishing profile to maintain the removal uniformity within a specified range.

12. The system of claim 8 further including the step of detecting an end point for the polishing by using the film thickness at the first point as determined in step b) and the film thickness at the second point as determined in step c).

13. The system of claim 8 wherein the polishing profile is determined by running a design of experiments considering the process variables that affect the removal rate and the removal uniformity.

14. A method for optimizing CMP (chemical mechanical polishing) processing of semiconductor wafers on a CMP machine, the method comprising the steps of:

a) polishing a test series of semiconductor wafers on a CMP machine b) determining a film thickness at a first point proximate to a center of the respective wafers using a film thickness detector coupled to the CMP machine;

c) determining a film thickness at a second point proximate to an outside edge of the respective wafers using the film thickness detector;

d) based upon the film thickness at the first point and the second point, determine a polishing profile describing a removal rate and a removal uniformity with respect to a set of process variables, the process variables including an amount of down force applied to the wafer;

e) polishing a production wafer on the CMP machine in accordance with the polishing profile;

f) determining a removal rate and a removal uniformity for the production wafer by determining a film thickness at the center of the product wafer and a film thickness at the outside edge of the product wafer using the film thickness detector;

g) adjusting the set of process variables in accordance with the removal rate and the removal uniformity for the production wafer determined in step f) to optimize the CMP process for the production wafer; and h) detecting an end point for the polishing by using the film thickness at the first point as determined in step b) and the film thickness at the second point as determined in step c).

15. The method of claim 14 wherein the process variables include a rate of rotation of the wafer.

16. The method of claim 14 wherein the process variables include a rate of rotation of a polishing pad of the CMP machine.

17. The method of claim 14 wherein the polishing profile includes information describing a clear time at the edge of the wafer and the clear time at the center of the wafer.

18. The method of claim 14 further including the step of adjusting the set of process variables in accordance with the polishing profile to maintain the removal rate within a specified range.

* * * * *